March 19, 1968    J. C. LAUFER, SR    3,373,905
LIQUID DISPENSING MEANS
Filed June 17, 1966
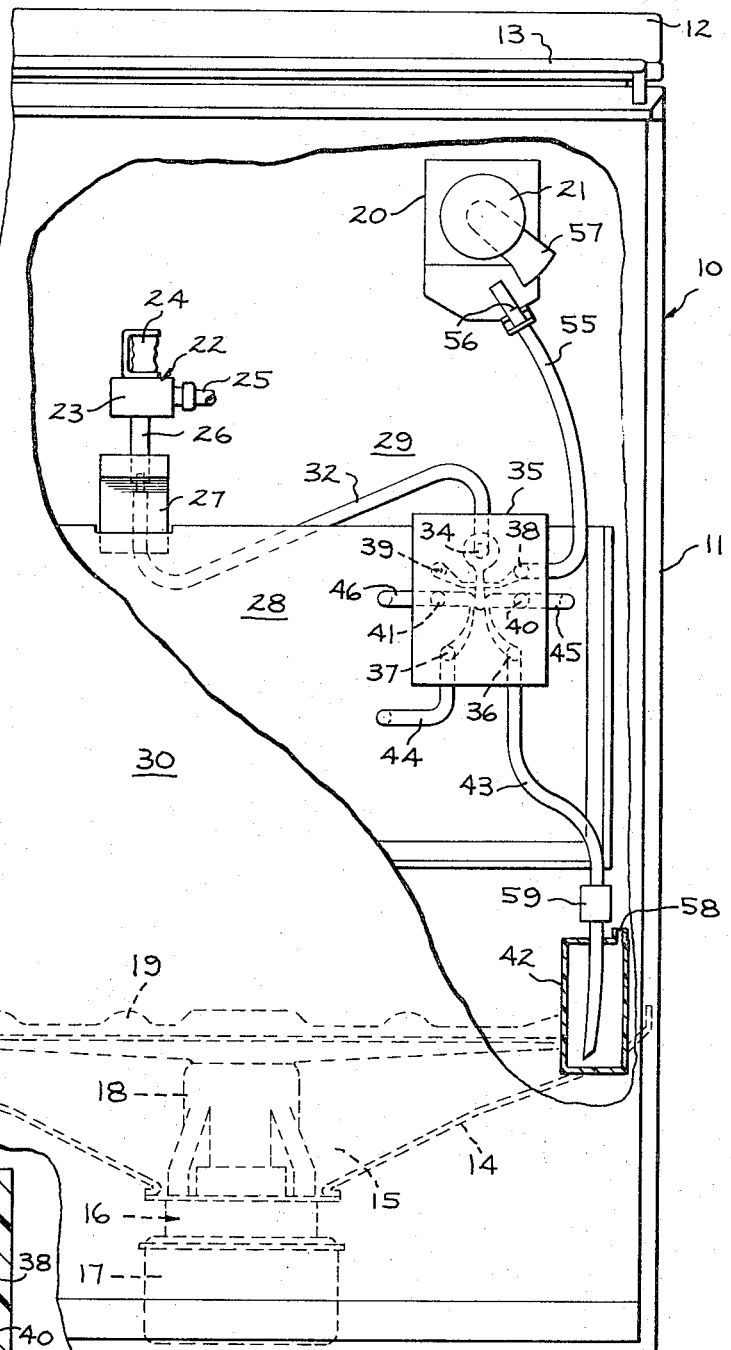
FIG. 1
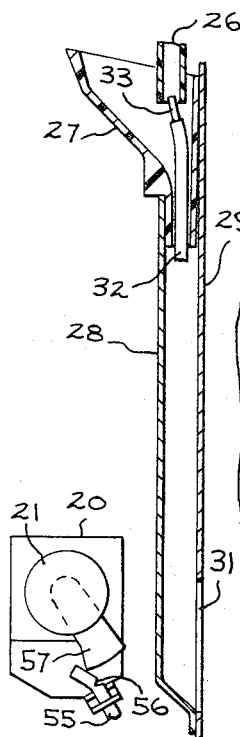
FIG. 2
FIG. 4
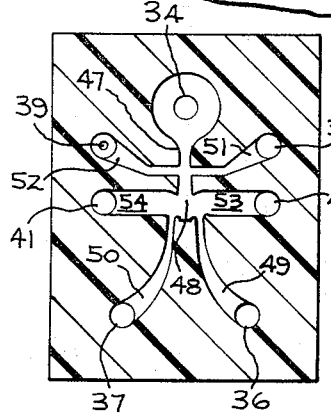
FIG. 3
INVENTOR.
JOHN C. LAUFER, SR.
BY James E. Espe
HIS ATTORNEY

:::::

United States Patent Office 3,373,905
Patented Mar. 19, 1968

3,373,905
LIQUID DISPENSING MEANS
John C. Laufer, Sr., Louisville, Ky., assignor to General Electric Company, a corporation of New York
Filed June 17, 1966, Ser. No. 558,371
9 Claims. (Cl. 222—193)

This invention relates generally to a means for dispensing a liquid and, more specifically, to such means particularly adapted for dispensing a liquid additive into an automatic washing machine.

The present invention is particularly useful as a rinse aid injector for an automatic dishwasher, a liquid detergent dispenser for either an automatic dishwasher or for an automatic clothes washer, although obviously not limited in usefulness to any particular application. Most devices, of the nature just mentioned, heretofore have involved relatively costly and mechanically complex arrangements. For example, the most common rinse aid injector in use today includes a very expensive solenoid to operate the metering or dispensing mechanism. Since a solenoid is used, there is also an additional switch required in the sequence control means to selectively and periodically energize the solenoid. Also, detergent dispensers or bleach dispensers usually involve mechanical devices having moving parts susceptible to wear and resultant malfunction. Therefore, it would be desirable to provide an improved liquid dispensing means, particularly adapted for dispensing a liquid additive into an automatic washing machine, which is comparatively inexpensive to manufacture but reliable in operation.

Accordingly, it is an object of this invention to provide an improved liquid dispensing means.

It is another object of this invention to provide an improved liquid dispensing means which is relatively inexpensive to manufacture but which provides comparatively reliable operation.

Briefly stated, in accordance with one aspect of the present invention, there is provided means to selectively dispense a liquid from a container into a receptacle including fluid amplifier means having a main inlet, at least one control inlet, a first outlet and a second outlet. Means are provided to interconnect the first outlet with the container while the second outlet communicates with the receptacle. The means interconnecting the first outlet with the container includes a check valve to prevent flow in a direction from the first outlet toward the container but to allow flow in the opposite direction. Means are provided to interconnect the main inlet with a source of liquid under pressure. Also provided are means to control the admission of control fluid to the control inlet whereby the liquid entering the fluid amplifier through the main inlet is selectively directed out through either of the first or second outlets. The fluid amplifier is adapted to aspirate liquid from the container in through the first inlet to mix with the liquid entering the main outlet when the control fluid entering through the control inlet directs the flow out through the second outlet.

While the specification concludes with claims particularly pointing out and distinctly claiming the subject matter which is regarded as the invention, it is believed the invention will be better understood from the following description taken in connection with the accompanying drawing, in which:

FIGURE 1 is a fragmentary elevational view, partially cut away to show details, of an automatic washing machine employing the present invention;

FIGURE 2 is a fragmentary sectional view, as observed from the right side of FIGURE 1, of the means to admit water to an automatic washing machine of FIGURE 1;

FIGURE 3 is an enlarged sectional view of a fluid amplifier employed in the present invention; and, FIGURE 4 is a fragmentary view of a portion of the dispensing means of FIGURE 1 shown in a condition of operation different from that illustrated in FIGURE 1.

Referring now to the drawing, and particularly to FIGURE 1 thereof, an automatic washing machine in the form of an automatic dishwasher 10 is illustrated. Dishwasher 10 includes an outer cabinet 11 having therein a wash chamber or receptacle adapted to receive articles, such as dishes, to be washed therein. Access to the wash chamber is achieved by means of a door 12 which is hinged to cabinet 11. If dishwasher 10 is a portable model, i.e., provided with rollers so that it may be moved about, a handle 13 may be provided to facilitate movement of the dishwasher. Although not visible in the drawing, it is to be understood that dishwasher 10 contains, within its wash chamber, dish-supporting racks adapted to receive and support dishes to be washed. The lower extremity of the wash chamber is defined by a bottom wall 14 which has a centrally depressed portion forming a sump 15. Positioned within sump 15 and supported by bottom wall 14 is a motor-pump assembly 16 which includes an electrically-reversible motor 17 and a pump 18. Pump 18 may be directly mechanically linked to motor 17 so that, when motor 17 is operated in one direction of rotation, pump 18 is rotated to withdraw wash fluid from sump 15 and propel it upwardly through a rotatable reaction-type spray arm 19 from which the fluid is discharged to generate a wash action within the wash chamber. In the other direction of rotation of motor 17, pump 18 is rotated to withdraw wash fluid from sump 15 and propel it out through an effluent discharge conduit (not shown) which communicates with a normal household sewer system.

Suitable sequence control means 20 are provided to control the electrical energization of the motor 17 as well as any other electrical components necessary to carry out the washing operation of dishwasher 10. As is well known in the automatic washing machine art, sequence control means 20 includes a synchronous electric timer motor and a plurality of cam operated switches which are opened and closed in predetermined sequence to carry out a complete washing cycle of operations. Sequence control means 20 may include a manually operable knob 21 which is extended beyond outer cabinet 11 so that the operator of dishwasher 10 may manually grasp knob 21 and rotate it to initiate operation of dishwasher 10 whereupon sequence control means 20 will continue to conduct the machine through a complete cycle of operation.

A conventional complete cycle of operation for a dishwasher such as that illustrated in FIGURE 1, includes a plurality of admissions of water to the wash chamber, each of which is followed by energization of the motor 17 so that pump 18 propels the water thus admitted to the wash chamber up through spray arm 19 from where it is ejected into the racks supporting the articles to be washed. Each of these periods is followed by a drain operation during which motor 17 is reversed and pump 18 propels the water in sump 15 out through an effluent discharge into the sewer system. The terminal portion of the cycle of operation usually includes a dry cycle during which time an electrical resistance heating element (not shown) within the wash chamber is energized to facilitate drying of the articles. Following at least one of the aforementioned fills of water is the addition of detergent to the water to facilitate washing of the articles. Accordingly, a complete cycle of operation for the dishwasher may include an initial fill of water, a rinse cycle during which time spray arm 19 sprays water up through the articles supported by the racks, and a drain cycle during which time the water is drained from the wash chamber. This would constitute a first pre-rinse. An identical series of operations may follow constituting a second pre-rinse. This would be followed by a fill of water, an elongated period of activity by spray arm 19 during which time the detergent is added to the water, followed by a drain cycle during which the wash fluid is drained from wash chamber. This latter cycle would be the wash cycle and would be followed by at least one, and preferably two, rinses identical to the aforedescribed pre-rinses. After the final rinse, the wash chamber would be drained of liquids and the electrical resistance heating element would be energized for an elongated length of time after which the sequence control means would de-energize the entire dishwasher.

It is to be understood, of course, that the sequence control means 20 controls the energization and de-energization of the individual components to carry out the aforedescribed complete cycle of operation. The admission of water to the wash chamber is controlled by a water admission means 22 which includes a valve 23 and a solenoid 24 to operate the valve. Solenoid 24 is controlled by sequence control means 20. A conduit 25 interconnects the valve 23 with a supply or source of water under pressure. The outlet of valve 23 communicates with a conduit 26 which opens into a fill funnel 27. Funnel 27 rests atop a vent plate 28 spaced from a wall 29 defining the wash chamber of dishwasher 10. It is to be understood that wall 29 is spaced inwardly from the front wall 30 of outer cabinet 11. The space between walls 29 and 30 defines a compartment within which water admission means 22 and sequence control means 20, among other elements, are disposed. The lower end of vent plate 28 is secured to the outer surface of wall 29. Wall 29 has an opening 31 immediately above the point at which vent plate 28 contacts wall 29. One purpose of vent plate 28 is to prevent the escape of liquids through opening 31 during that portion of the dishwasher cycle of operation when spray arm 19 is spraying liquids within the wash chamber of dishwasher 10. Opening 31 has a primary purpose of venting the wash chamber of dishwasher 10 during the drying cycle to allow the admission of relatively dry air to the wash chamber to replace relatively moisture laden air which escapes from the wash chamber through a second vent (not shown). However, vent plate 28 and opening 31 serve the additional purpose of conducting the water entering fill funnel 27 from conduit 26 into wash chamber 12 during the fill portions of the dishwasher cycle of operation.

In the conventional installation, the admission of such additives as detergent, rinse aid or bleach is controlled by the sequence control means through additional solenoids or mechanically-tripped, spring-loaded devices. The present invention incorporates an additive dispensing means directly into the water fill system and, in so doing, obviates solenoids or spring-loaded mechanically-tripped mechanisms. In accordance with the present invention, an improved liquid dispensing means is provided and includes a conduit 32 having a portion 33 of reduced diameter to be at least partially received in the open end of conduit 26. Conduit 32 conveys fluid from conduit 26 to the main inlet 34 of a fluid amplifier or similar device 35. Fluid amplifier 35 further includes a first outlet 36 and a second outlet 37, a pair of control inlets 38 and 39, and a pair of vent outlets 40 and 41. Outlet 36 communicates with the interior of liquid additive container 42 by means of a conduit 43. Outlet 37 communicates directly with the area between vent plate 28 and wall 29 by means of a conduit 44 which extends from outlet 37 through an opening in vent plate 28. Similarly, vent outlets 40 and 41 communicate directly with the area between vent plate 28 and wall 29 by means of conduits 45 and 46 respectively.

Fluid amplifiers, of the type illustrated, which is the type utilizing a side control jet to deflect a main fluid flow into one of several branch passages, are well known. In this type of device a main flow passageway is connected to a chamber from which branch passageways lead off. At the point where the main flow enters the chamber, side ports for passage of control fluid transverse to the main flow are provided which, by selectively allowing such control fluid to flow, will control the main flow by deflecting it into the desired passage. These devices are therefore referred to as fluid amplifiers due to the fact that a small control fluid flow may be utilized to control the flow of a large fluid stream. Naturally, an advantage of such control devices is that the momentum of the primary flow stream is preserved and any pressure drop across the device is relatively small. In addition, such devices may be made to be bi-stable. That is, once the primary stream is deflected to flow through a given branch stream, the boundary layer effect between this stream and the flow passage walls tend to lock the primary stream to flow in that direction.

Referring again to the drawing, and particularly to FIGURES 1 and 3, the operation of the specific fluid amplifier 35 employed in the preferred embodiment of the present invention will be presented. Water passing through valve 23 and conduit 26 has a portion thereof entering fluid amplifier 35 through inlet 34. This water is supplied under substantial pressure, created by the velocity of water issuing from conduit 26, and substantial potential mass flow. Water entering inlet 34 passes through a passageway 47 and into a chamber 48. From chamber 48 the water may exit through passageway 49 and then out through the first outlet 36 or it may exit from chamber 44 through passageway 50 and then out through the second outlet 37. As is well known in the fluid amplifier art, control inlets 38 and 39 communicate with chamber 48 by means of passageways 51 and 52 respectively. A jet of control fluid, either air or water, may be applied to chamber 48 by either of passageways 51 or 52. In the most common arrangement, when a control jet enters chamber 48 from passageway 51 simultaneously with the main fluid flow from passageway 47, the resulting mixture exits from chamber 48 through passageway 50. Chamber 48 and its adjoining passageways may be so designed that under the foregoing conditions, virtually no fluid will exit through passageway 49. In fact, the chamber 48 and its adjoining passageways may be designed such that a negative pressure will be created at the point where passageway 49 meets chamber 48 to create a flow in through outlet 36 and along passageway 49 toward chamber 48. Similarly, if a control jet is introduced into chamber 48 from passageway 52, and if chamber 48 and the adjoining passageways have been so designed, no fluid will exit through passageway 50.

The fluid amplifier may be designed so that, instead of applying a positive control jet by means of either of passageways 51 or 52, it is possible to control the flow of fluid by letting the main fluid flow entering chamber 48 through passageway 47 aspirate the control fluid through either passageway 51 or 52. With this arrangement, if control inlet 38 is closed, fluid entering through inlet 34 and passing through passageway 47 into chamber 48, will tend to exit from chamber 48 through passageway 49 and out through outlet 36. On the other hand, if control inlet 38 is opened, fluid entering chamber 48 through passageway 47 will aspirate air through passageway 51 and the resulting mixture will exit through passageway 50. It should be understood that the configuration of chamber 48 may be such that control inlet 39 and passageway 52 may be entirely deleted. Also, if desired, inlet 39 and passageway 52 may serve as a tuning means whereby a device such as a needle valve is positioned within inlet 39 and adjusted so that fluid amplifier 35 will operate as described above with greater stability due to the adjusting features of the tuning means. In the preferred embodiment of the present invention, it has been found, in practice, desirable to retain inlet 39 and passageway 52 but to make inlet 39 an opening having a diameter of relatively small dimension compared to the diameter of inlet 38 so that a relatively small amount of air may aspirate through passageway 52 which provides a certain degree of stability to the fluid amplifier 35.

Vent outlets 40 and 41 of fluid amplifier 35 communicate with chamber 48 by means of passageways 53 and 54, respectively. The purpose of the vent outlets 40 and 41 is to vent any fluid entering chamber 48 through passageway 47 in the event that both outlets 36 and 37 are blocked off. Also, if fluid amplifier 35 is pre-conditioned, by the opening or closing of the control inlets 38 and 39, to conduct the fluid out through either of the outlets 36 and 37 and that particular outlet is blocked, under normal conditions of operation, the fluid will exit from one or the other of vent outlets 40 or 41 rather than out through the other outlet. If vent outlets 40 and 41 were not provided, and both outlets 36 and 37 were blocked, fluid entering amplifier 35 through inlet 34 would be forced to exit from fluid amplifier 35 through either of the control inlets 38 or 39.

Means are provided to control the admission of air, to be used as a control fluid, through control inlet 38 and include a conduit 55 having a slit 56 in a flexible portion thereof. A cam 57 rotates about a shaft driven by the timer motor of the sequence control means 20, to flex a portion of conduit 55 to open slit 56, as best shown in FIGURE 4, to allow air to aspirate through conduit 55 and control inlet 38.

As mentioned above, the outlet 36, of fluid amplifier 35 communicates with a conduit 43 which extends into a container 42. Container 42 is adapted to receive and contain a liquid additive such as, for example, a rinse aid, liquid detergent or bleach. Conduit 43 terminates with an open end near the bottom of the container 42 so that it will be in liquid-receiving relationship with any liquid in container 42 until the level of the liquid substantially reaches the bottom of the container. A vent 58 is provided to allow air to enter container 42 as liquid is removed therefrom. A check valve 59 is provided in conduit 43 to allow flow therethrough in a direction from container 42 toward fluid amplifier 35 but to prevent flow in a direction from fluid amplifier 35 toward container 42. Check valve 59 may be of any conventional construction, the exact construction not being critical to the present invention. Its purpose being to prevent dilution of the liquid aid by the admission of water into container 42.

Fluid amplifier 35 is designed such that the water entering inlet 34, under normal conditions of operation, has sufficient velocity and mass flow as it passes the junction of passageway 49 with chamber 48, to aspirate the liquid within container 42 through conduit 43 and outlet 36 to mix with the water passing through chamber 48 whenever fluid amplifier 35 is conditioned for flow out through outlet 37.

With the aforedescribed arrangement, whenever valve 22 is opened water will enter fluid amplifier 35 through conduit 32 and inlet 34. Depending upon the relationship between cam 57 and the flexible portion of conduit 55, air will be allowed to aspirate in through control inlet 38 or will be prevented from such aspiration. If cam 57 has opened slit 56, air may so aspirate and, under this condition, the water entering fluid amplifier 35 through main inlet 34 will exit from fluid amplifier 35 through outlet 37 and conduit 44 to enter the area between vent plate 28 and wall 29. From this area, the water will pass into the wash chamber through opening 31. As mentioned above, during this condition of operation of fluid amplifier 35, and with sufficent velocity and mass flow of the liquid entering through inlet 34, there will be established an aspiration in through outlet 36 and passageway 49. If the liquid within container 42 is at a sufficiently high level so that conduit 43 is submerged therein, this aspiration effect will draw liquid from container 42 up through conduit 43 and into fluid amplifier 35 through outlet 36. This fluid will pass through passageway 49 and mix with the liquid entering chamber 48 through passageway 47. The resulting mixture will pass from chamber 48 through passageway 50 and outlet 37 and into the wash chamber of dishwasher 10.

During those times when cam 57 is not maintaining slit 56 open, the absence of aspiration of control fluid in through inlet 38 tends to cause the liquid entering fluid amplifier 35 through main inlet 34 out through outlet 36, which would be the conventional operation of a fluid amplifier having the characteristics of fluid amplifier 35. However, check valve 59 prevents flow through conduit 43 in a direction from outlet 36 toward container 42. Accordingly, there will be a build up of pressure and liquid within fluid amplifier 35 concentrated in chamber 48. Due to the characteristics of a fluid amplifier such as fluid amplifier 35, as are well known now in the fluid amplifier art, liquid entering chamber 48 through passageway 47 will be expelled out through either or both of vent outlets 40 and 41. Because vents 40 and 41 communicate with the wash chamber of dishwasher 10 by means of conduits 45 and 46 as well as opening 31, the water thus entering fluid amplifier 35 will be directed into the wash chamber of dishwasher 10.

The preferred form of the present invention may be modified, if desired, by deleting vent outlets 40 and 41 and passageways 53 and 54 and substituting therefore a branch conduit extending from conduit 43 to the area between vent plate 28 and wall 29. A check valve would be required in such branch conduit to prevent flow therethrough toward fluid amplifier 35 so that air would not be aspirated in lieu of liquid from container 42. With this modified arrangement, operation would be the same with slit 56 opened. When slit 56 was closed, water would exit from fluid amplifier 35 through outlet 36, conduit 43 and the branch conduit into the wash chamber. This modified arrangement would necessitate an additional check valve which would be, in all probability, more expensive to provide than the vent outlets 38 and 39 and the passageways 53 and 54. Thus, the illustrated embodiment is the presently preferred one.

Thus it can be seen that the present invention provides a relatively inexpensive, though reliable, liquid dispensing means especially suitable for use in an automatic washing machine although not limited in its application to such use. The fluid amplifier illustrated costs only a fraction of the cost of a solenoid operated dispensing means and, at the same time, has no moving parts subject to wear and eventual malfunction.

As will be evident from the foregoing description, certain aspects of the invention are not limited to the particular details of construction of the example illustrated, and it is contemplated that other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. Means to dispense a liquid from a container into a receptacle comprising:
   (a) a fluid amplifier having a main inlet, at least one control inlet, a first outlet and a second outlet,
   (b) means interconnecting said first outlet with the container,
   (c) said second outlet communicating with the receptacle,
   (d) said means interconnecting said first outlet with the container including means to prevent flow in a direction from said first outlet toward the container but to allow flow in the opposite direction,
   (e) means interconnecting said main inlet with a source of liquid under pressure, and
   (f) means to control the admission of control fluid to said control inlet whereby the liquid entering said fluid amplifier through said main inlet is selectively directed out through either of said first and second outlets, (g) said fluid amplifier being adapted to aspirate liquid from the container in through said first outlet to mix with the liquid entering said main inlet when the control fluid entering through said control inlet directs the flow out through said second outlet.

2. The invention of claim 1 wherein the receptacle comprises the wash chamber of an automatic washing machine having a sequence control means and said means to control the admission of control fluid is operated by said sequence control means.

3. Means to dispense a liquid additive from a container into the wash chamber of an automatic washing machine comprising:

(a) a fluid amplifier having a main inlet, at least one control inlet, a first outlet and a second outlet,
(b) said first outlet communicating with the container in liquid-receiving relationship therewith,
(c) said second outlet communicating directly with the wash chamber of the automatic washing machine,
(d) means to prevent flow from said first outlet in a direction toward the container,
(e) said main inlet being in liquid-receiving relationship with a source of water under pressure, and
(f) means to control the admission of control fluid to said control inlet whereby the water entering said fluid amplifier through said main inlet is selectively directed out through either of said first and second outlets,
(g) said fluid amplifier being adapted to aspirate liquid from the container through said first outlet to mix with the water entering said main inlet when the control fluid entering through said control inlet directs the flow out through said second outlet.

4. The invention of claim 3 further including means to admit water directly to the wash chamber comprising an inlet funnel in one wall of the wash chamber, a valve disposed above said funnel, a first conduit from said valve opening into said funnel, a second conduit spaced from said first conduit but in water-receiving relationship therewith and communicating with said main inlet so that at least a portion of the water passing through said valve is conveyed to said main inlet.

5. Means to dispense a liquid from a container into the wash chamber of an automatic washing machine comprising:

(a) means to admit water directly into the wash chamber including a first conduit opening downwardly into a funnel-like element and a valve to control the admission of water to said first conduit,
(b) a second conduit having an open end disposed adjacent to said first conduit to receive at least a portion of the water issuing therefrom,
(c) a fluid amplifier having a main inlet in liquid-receiving relationship with said second conduit, at least one control inlet, a first outlet and a second outlet,
(d) a third conduit interconnecting said second outlet with the container,
(e) means interconnecting said first outlet with the wash chamber whereby liquid passing through said first outlet will be conveyed into the wash chamber, and
(f) means to control the admission of control fluid to said control inlet whereby the water entering said fluid amplifier through said main inlet is selectively directed out through either of said first and second outlets,
(g) said fluid amplifier being adapted to aspirate liquid from said container through said first outlet to mix with the water entering said main inlet when the control fluid entering through said control inlet directs the flow out through said second outlet.

6. The invention of claim 5 further comprising means in said third conduit to prevent flow therethrough in a direction from said fluid amplifier toward said container.

7. The invention of claim 6 wherein said fluid amplifier has at least one vent outlet communicating with the wash chamber whereby fluid may escape from said fluid amplifier into the wash chamber whenever said control inlet causes fluid to attempt to exit from said fluid amplifier through said first outlet.

8. The invention of claim 5 further comprising a branch conduit providing communication between said third conduit and the wash chamber and having therein means to prevent fluid flow through said branch conduit in a direction toward said third conduit.

9. In an automatic dishwasher having a wash chamber, a vent opening and a vent plate adjacent to said vent opening and spaced from one wall of the dishwasher cabinet, means to dispense a liquid into the wash chamber of the dishwasher comprising:

(a) a fluid amplifier secured to said vent plate and having a main inlet, at least one control inlet, a first outlet and a second outlet,
(b) water admission means including a valve having an outlet directed into the area between said vent plate and said wall to direct water through said vent opening,
(c) a first conduit having an open end spaced from but in liquid-receiving relationship with said valve and connected at its other end to said main inlet to convey at least a portion of the water issuing from said valve to said fluid amplifier,
(d) a container adapted to receive and store a liquid additive,
(e) a second conduit interconnecting said container and said first outlet,
(f) said second outlet communicating with said wash chamber through said vent plate, and
(g) means to control the admission of control fluid to said control inlet whereby the water entering said fluid amplifier through said main inlet is selectively directed out through either of said first and second outlets,
(h) said fluid amplifier being adapted to aspirate liquid from the container through said first outlet to mix with the water entering said main inlet when the control fluid entering through said control inlet directs the flow out through said second outlet.

References Cited

UNITED STATES PATENTS

| | | | |
|---|---|---|---|
| 2,766,910 | 10/1956 | Bauerlein | 222—193 X |
| 2,811,389 | 10/1957 | Fischer | 222—193 X |
| 3,062,032 | 11/1962 | Toma | 134—100 X |
| 3,091,393 | 5/1963 | Sparrow | 137—81.5 |

ROBERT B. REEVES, *Primary Examiner.*

F. R. HANDREN, *Assistant Examiner.*